(12) United States Patent
Chiu

(10) Patent No.: US 9,689,553 B2
(45) Date of Patent: Jun. 27, 2017

(54) LENS AND LIGHT EMITTING DEVICE USING SAME

(71) Applicant: HON HAI PRECISION INDUSTRY CO., LTD., New Taipei (TW)

(72) Inventor: Po-Chin Chiu, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 14/887,590

(22) Filed: Oct. 20, 2015

(65) Prior Publication Data

US 2017/0059121 A1    Mar. 2, 2017

(30) Foreign Application Priority Data

Aug. 25, 2015 (TW) .............. 104127782 A

(51) Int. Cl.
*F21V 3/00* (2015.01)
*F21V 5/00* (2015.01)
*F21V 5/04* (2006.01)
*F21Y 101/02* (2006.01)

(52) U.S. Cl.
CPC .............. *F21V 5/046* (2013.01); *F21V 5/043* (2013.01); *F21Y 2101/02* (2013.01)

(58) Field of Classification Search
CPC ....... F21V 5/046; F21V 5/043; F21Y 2101/02
USPC .......................... 362/311.02, 311.09; 257/98
See application file for complete search history.

(56) References Cited

U.S. PATENT DOCUMENTS

| 7,207,700 | B2* | 4/2007 | Fallahi | F21S 48/2212 362/334 |
| 2010/0284194 | A1* | 11/2010 | Miyashita | F21V 5/04 362/311.09 |
| 2014/0014995 | A1* | 1/2014 | Pindl | H01L 33/483 257/98 |
| 2014/0239336 | A1* | 8/2014 | Streppel | F21V 5/045 257/98 |
| 2015/0117029 | A1* | 4/2015 | Dai | G02B 19/0014 362/311.06 |

* cited by examiner

*Primary Examiner* — Anh Mai
*Assistant Examiner* — Glenn Zimmerman
(74) *Attorney, Agent, or Firm* — Steven Reiss

(57) ABSTRACT

The disclosure relates to a lens, the lens includes a bottom surface and a light emergent surface relative to the bottom surface, the bottom surface defines a recess configured to receive a light source. The lens further includes a light incident surface opposite to the recess, the light incident surface faces away from the light emergent surface. The light incident surface is formed by a number of ring-shaped curved surfaces connected to each other one by one. The disclosure also relates to a light emitting device using the same.

12 Claims, 4 Drawing Sheets

LENS AND LIGHT EMITTING DEVICE USING SAME

FIELD

The subject matter herein generally relates to a lens and a light emitting device using the lens.

BACKGROUND

As development of optical technology, various optical elements are applied in many different fields. In a lighting field, an optical lens is used to change a path of light emitted by a light source to achieve desired optical effect. For example, a surface of the lens is designed as a curved surface (concave surface or convex surface) to converse or diffuse light passing therethrough. However, the surface of the lens is usually a single curved surface, when the lens is used in a near-field light field, the lens fails to adjust path of light only by structure of itself.

BRIEF DESCRIPTION OF THE DRAWINGS

Implementations of the present technology will now be described, by way of example only, with reference to the attached figures.

DETAILED DESCRIPTION

Figure 1:
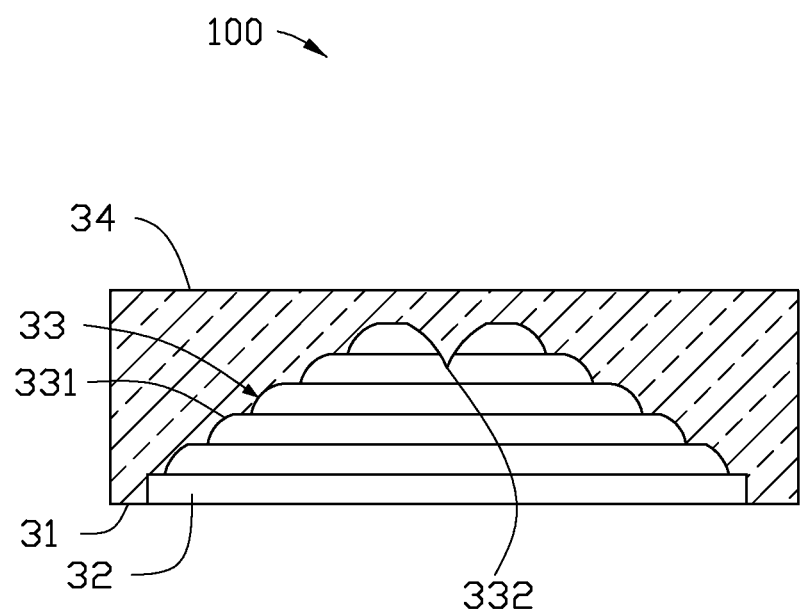
FIG. 1 is a cross-sectional view of a lens of a first embodiment of the disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

Several definitions that apply throughout this disclosure will now be presented.

The term "substantially" is defined to be essentially conforming to the particular dimension, shape or other word that substantially modifies, such that the component need not be exact. For example, substantially cylindrical means that the object resembles a cylinder, but can have one or more deviations from a true cylinder. The term "comprising," when utilized, means "including, but not necessarily limited to"; it specifically indicates open-ended inclusion or membership in the so-described combination, group, series and the like.

The present disclosure is described in relation to a lens and a light emitting using the same.

FIG. 1 illustrates a lens 100 of a first embodiment of the present disclosure, the lens 100 is substantially cylindrical-shaped. The lens 100 includes a bottom surface 31 and a light emergent surface 34 opposite to the bottom surface 31. In at least one embodiment, the light emergent surface 34 is a flat surface, which is easy to clear pollutants fell over the light emergent surface 34. The bottom surface 31 defines a recess 32, the recess 32 is configured to receive a light source 10 (see in FIG. 2). The lens 100 further includes a light incident surface 33 opposite to the recess 32, the light incident surface 33 faces away from the light emergent surface 34. The light incident surface 33 is formed by a number of ring-shaped curved surfaces 331 connected to each other one by one, the surfaces 331 are concave surfaces. In at least one embodiment, the light incident surface 33 is symmetric relative to a center axis of the lens 100. Inner diameters of rings formed by the curved surfaces 331 gradually decrease from the bottom surface 31 to the light emergent surface 34. The lens 100 includes a protrusion 332 formed on a top portion of the light incident surface 33, the protrusion 332 protrudes from the top portion of the light incident surface 33 toward the bottom surface 31. In at least one embodiment, the protrusion 32 is substantially taper-shaped. The protrusion 332 can make incident light being refracted for multiple times, so the lens 100 has a better light diffusing performance. In at least one embodiment, a peripheral surface of the protrusion 32 is a concave surface.

Figure 2:
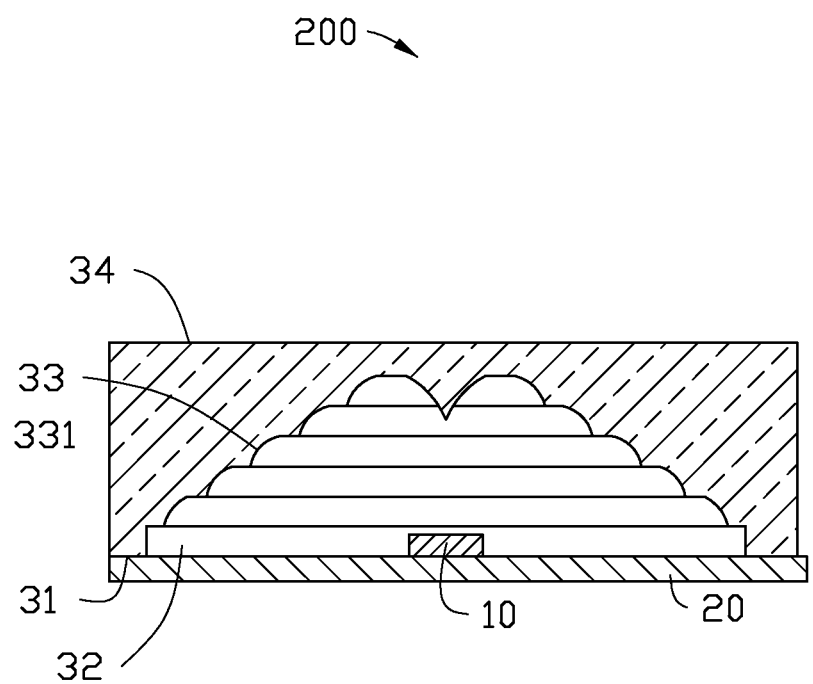
FIG. 2 is a cross-sectional view of a light emitting device using the lens of FIG. 1.

Referring to FIG. 2, a light emitting device 200 using the lens 100 of the first embodiment includes a light source 10, a package substrate 20 and the lens 100. The light source 10 is arranged on the package substrate 20 and is received in the recess 32. The package substrate 20 seals the recess 32 to make the light source 10 being enclosed in the recess 32. In at least one embodiment, the light source 10 is a LED light source; a geometric center of the light source 10 is located on the center axis of the lens 100.

In operation of the lens, light emitted by the light source 10 reaches to the light incident surface 33 and enters into the lens 100, the incident light are refracted and reflected for many times by the light incident surface 33 before emitted from the light emergent surface 34, therefore, the light emitted from the lens 100 are diffused.

Figure 3:
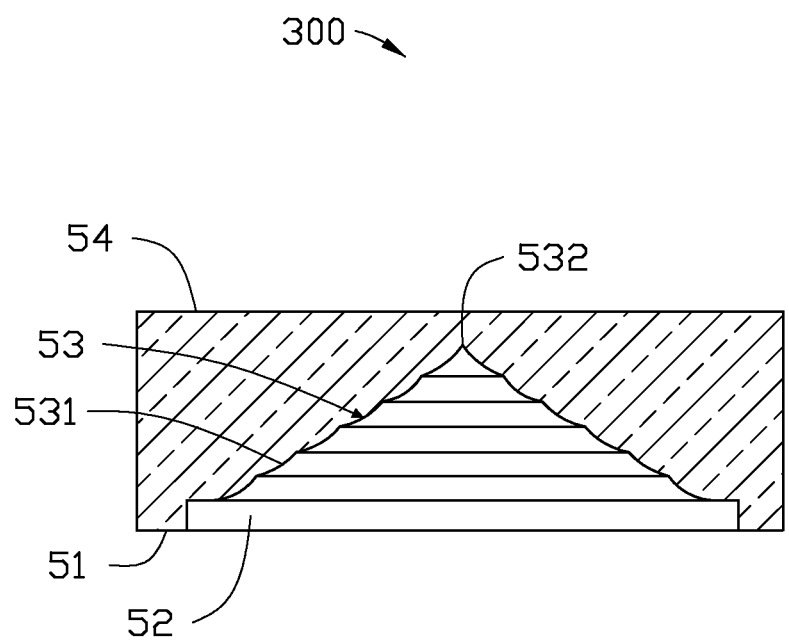
FIG. 3 is a cross-sectional view of a lens of a second embodiment of the disclosure.

FIG. 3 illustrates a lens 300 of a second embodiment of the present disclosure, the lens 300 is substantially similar to the lens 100 of the first embodiment. The lens 300 is substantially cylindrical-shaped. The lens 300 includes a bottom surface 51 and a light emergent surface 54 opposite to the bottom surface 51. In at least one embodiment, the light emergent surface 54 is a flat surface, which is easy to clear pollutants fell over the light emergent surface 54. The bottom surface 51 defines a recess 52, the recess 52 is configured to receive a light source 10 (see in FIG. 4). The lens 300 further includes a light incident surface 53 opposite to the recess 52, the light incident surface 53 faces away from the light emergent surface 54. The light incident surface 53 is formed by a number of ring-shaped curved surfaces 531 connected to each other one by one, the surfaces 531 are convex surfaces. In at least one embodiment, the light incident surface 53 is symmetric relative to a center axis of the lens 300. Inner diameters of rings formed by the curved surfaces 531 gradually decreases from the bottom surface 51 to the light emergent surface 54. The lens 300 defines a groove 532 formed on a top portion of the light incident surface 53, the groove 532 protrudes from the top portion of the light incident surface 53 toward the bottom surface 51. The groove 532 can make incident light being refracted and reflected for many times, so the lens 300 has a better light convergent performance. An intersecting surface of the groove 532 parallel to the center axis of the lens 300 is substantially an isosceles triangle, a bottom margin of the isosceles triangle parallels to the bottom surface 51.

Figure 4:
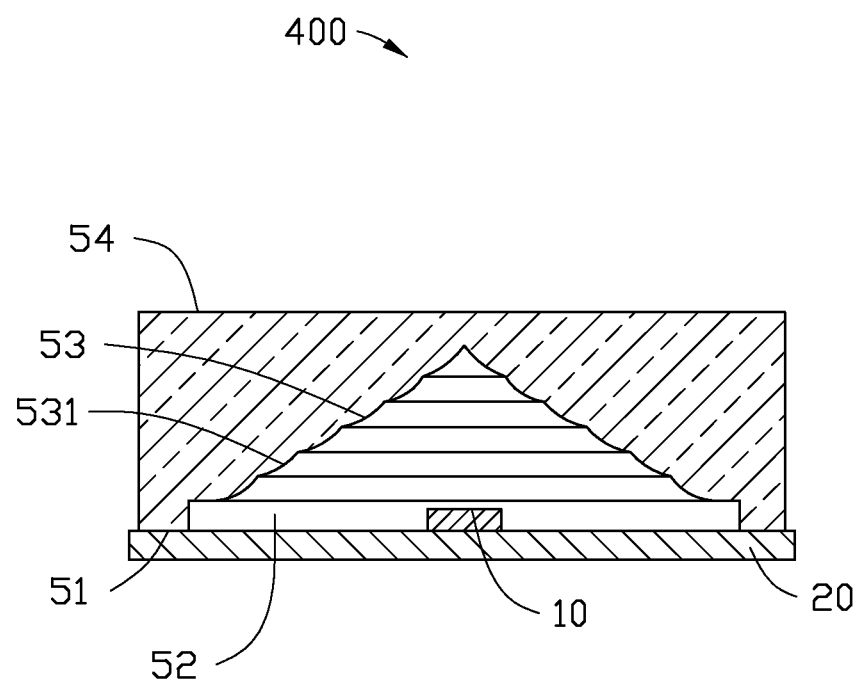
FIG. 4 is a cross-sectional view of a light emitting device using the lens of FIG. 3.

Referring to FIG. 4, a light emitting device 400 using the lens 300 of the second embodiment is similar to the light emitting device 200. The light emitting device 400 includes a light source 10, a package substrate 20 and the lens 300. The light source 10 is arranged on the package substrate 20, and is received in the recess 52. The package substrate 20 seals the recess 52 to make the light source 10 be enclosed in the recess 52. In at least one embodiment, the light source 10 is a LED light source; a geometric center of the light source 10 is located on the center axis of the lens 300.

In operation of the lens, light emitted by the light source 10 reaches to the incident surface 53 and enters into the lens 300, the incident light are refracted and reflected for many times by the light incident surface 53, before emitted from the light emergent surface 54, therefore, the lights emitted from the lens 300 are converged.

The embodiments shown and described above are only examples. Many details are often found in the art such as the other features of a lens and light emitting device using same. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, especially in matters of shape, size and arrangement of the parts within the principles of the present disclosure up to, and including the full extent established by the broad general meaning of the terms used in the claims. It will therefore be appreciated that the embodiments described above may be modified within the scope of the claims.

What is claimed is:

1. A lens comprising:
    a light emergent surface formed on one side of the lens;
    a bottom surface being on an opposite side of the lens to the light emergent surface and a recess being formed in the bottom surface;
    a light incident surface formed on the recess by a plurality of ring-shaped curved surfaces connected to each other, the curved surfaces directly connected to each other to form a plurality of connecting curves;
    wherein the lens defines a groove formed on a top portion of the light incident surface, the groove extends from the top portion of the light incident surface toward the bottom surface and narrows to a point from the top surface toward the bottom surface, a cross-sectional view of a bottom portion of the groove being an isosceles triangle, and the point of the groove lying on a center axis of the lens.

2. The lens of claim 1, wherein the curved surfaces are concave surfaces or convex surfaces.

3. The lens of claim 1, wherein inner diameters of rings formed by the curved surface gradually decrease from the bottom surface to the light emergent surface.

4. The lens of claim 1, wherein the lens is substantially cylindrical-shaped, the light incident surface is symmetric relative to the center axis of the lens.

5. A light emitting device comprising:
    a lens comprising:
        a light emergent surface formed on one side of the lens;
        a bottom surface being on an opposite side of the lens to the light emergent surface and a recess being formed in the bottom surface;
        a light incident surface formed on the recess by a plurality of ring-shaped curved surfaces connected to each other, the curved surfaces directly connected to each other to form a plurality of connecting curves;
    a light source being received in the recess;
    wherein the lens defines a groove formed on a top portion of the light incident surface, the groove extends from the top portion of the light incident surface toward the bottom surface and narrows to a point from the top surface toward the bottom surface, a cross-sectional view of a bottom portion of the groove being an isosceles triangle, and the point of the groove lying on a central axis of the lens.

6. The light emitting device of claim 5, wherein the light emitting device further comprising a package substrate, the package substrate seals the recess to enclose the light source in the recess.

7. The light emitting device of claim 5, wherein the light source emits light onto the light incident surface.

8. The light emitting device of claim 5, wherein the light source is a LED light source.

9. The light emitting device of claim 5, wherein the curved surfaces are concave surfaces or convex surfaces.

10. The light emitting device of claim 5, wherein inner diameters of rings formed by the curved surface gradually decrease from the bottom surface to the light emergent surface.

11. The light emitting device of claim 5, wherein the lens is substantially cylindrical-shaped, the light incident surface is symmetric relative to the center axis of the lens.

12. The light emitting device of claim 8, wherein a geometric center of the light source is located on the center axis of the lens.

\* \* \* \* \*